(12) United States Patent
Czarnecki

(10) Patent No.: US 10,193,381 B2
(45) Date of Patent: Jan. 29, 2019

(54) LOAD MANAGEMENT AND SWITCHING DEVICES AND METHODS

(71) Applicant: Reliance Controls Corporation, Racine, WI (US)

(72) Inventor: Neil A. Czarnecki, Mount Pleasant, WI (US)

(73) Assignee: Reliance Controls Corporation, Racine, WI (US)

( * ) Notice: Subject to any disclaimer, the term of this patent is extended or adjusted under 35 U.S.C. 154(b) by 288 days.

(21) Appl. No.: 15/276,978

(22) Filed: Sep. 27, 2016

(65) Prior Publication Data

US 2018/0090986 A1 Mar. 29, 2018

(51) Int. Cl.
*H01H 9/26* (2006.01)
*H02J 9/06* (2006.01)

(52) U.S. Cl.
CPC ............ *H02J 9/066* (2013.01); *H01H 9/26* (2013.01); *H01H 2300/018* (2013.01)

(58) Field of Classification Search
USPC .......................................................... 307/29
See application file for complete search history.

(56) References Cited

U.S. PATENT DOCUMENTS

| | | | |
|---|---|---|---|
| 4,324,987 A | 4/1982 | Sullivan, II et al. | |
| 5,536,976 A | 7/1996 | Churchill | |
| 6,172,432 B1 | 1/2001 | Schnackenberg et al. | |
| 6,510,369 B1 | 1/2003 | Lacy | |
| 6,633,802 B2 | 10/2003 | Sodoski et al. | |
| 6,813,525 B2 | 11/2004 | Reid et al. | |
| 7,356,384 B2 | 4/2008 | Gull et al. | |
| 7,528,503 B2 | 5/2009 | Rognli et al. | |
| 7,615,888 B2 | 11/2009 | Lathrop et al. | |
| 7,687,935 B2 | 3/2010 | Bailey | |
| 7,778,737 B2 | 8/2010 | Rossi et al. | |
| 7,948,117 B2 | 5/2011 | Lathrop et al. | |
| 8,073,573 B2 | 12/2011 | Chassin et al. | |
| 8,204,632 B2 | 6/2012 | Abi-Sarnra | |
| 8,222,548 B2 | 7/2012 | Espeut, Jr. | |
| 8,350,405 B2 | 1/2013 | Vicari et al. | |

(Continued)

FOREIGN PATENT DOCUMENTS

CA 2384515 A1 10/2002
CN 104300583 A 1/2015

(Continued)

*Primary Examiner* — Rexford Barnie
*Assistant Examiner* — Xuan Ly
(74) *Attorney, Agent, or Firm* — Ryan Kromholz & Manion, S.C.

(57) ABSTRACT

A load management module for disconnecting continuous loads for a predetermined amount of time when an excessive load is experienced to permit critical intermittent loads to remain energized. The load management module has a first group of relays and a second group of relays each connected to various intermittent loads (e.g., lighting branch circuits) and each controlled by a timer. The load management module activates the relays when a maximum power output of a secondary power source is exceeded. An automatic transfer switch capable of operating with larger disconnect/breaker sizes (e.g., 200 amps) for larger emergency backup systems. The automatic transfer switch comprises a plate operably connected to a drive system and a pair of breakers.

11 Claims, 3 Drawing Sheets

(56) References Cited

U.S. PATENT DOCUMENTS

| | | |
|---|---|---|
| 8,410,633 B2 | 4/2013 | Batzler et al. |
| 8,415,830 B2 | 4/2013 | Lim et al. |
| 8,653,692 B2 | 2/2014 | Batzler et al. |
| 8,841,797 B2 | 9/2014 | Wischstadt et al. |
| 8,975,779 B2 | 3/2015 | Cooper et al. |
| 9,088,180 B2 | 7/2015 | Wedel et al. |
| 2005/0141154 A1* | 6/2005 | Consadori ............ B60R 16/023 361/62 |
| 2005/0216131 A1 | 9/2005 | Sodemann et al. |
| 2006/0018069 A1 | 1/2006 | Gull et al. |
| 2006/0229768 A1 | 10/2006 | Chassin et al. |
| 2007/0010916 A1 | 1/2007 | Rodgers et al. |
| 2007/0021874 A1 | 1/2007 | Rognli et al. |
| 2007/0222295 A1 | 9/2007 | Wareham et al. |
| 2008/0258558 A1 | 10/2008 | Lathrop et al. |
| 2009/0121544 A1 | 5/2009 | Bailey |
| 2010/0013308 A1 | 1/2010 | Lathrop et al. |
| 2010/0038966 A1 | 2/2010 | Espeut, Jr. |
| 2010/0207448 A1 | 8/2010 | Cooper et al. |
| 2010/0312414 A1 | 12/2010 | Kumar |
| 2011/0175450 A1 | 7/2011 | Vicari et al. |
| 2011/0298285 A1 | 12/2011 | Lim et al. |
| 2012/0053741 A1 | 3/2012 | Beyerle et al. |
| 2012/0242145 A1 | 9/2012 | Espeut, Jr. |
| 2012/0277929 A1 | 11/2012 | Wiszniewski et al. |
| 2013/0116847 A1 | 5/2013 | Frampton et al. |
| 2013/0187462 A1 | 7/2013 | Lim et al. |
| 2013/0193757 A1 | 8/2013 | Batzler et al. |
| 2013/0270908 A1 | 10/2013 | Wedel et al. |

FOREIGN PATENT DOCUMENTS

| | | |
|---|---|---|
| EP | 2081272 A2 | 7/2009 |
| EP | 1678587 A4 | 10/2009 |
| WO | WO200137392 A1 | 5/2001 |
| WO | WO2013067120 A1 | 5/2013 |
| WO | WO2014033467 A9 | 7/2014 |

* cited by examiner

US 10,193,381 B2

LOAD MANAGEMENT AND SWITCHING DEVICES AND METHODS

BACKGROUND OF THE INVENTION

Power outages are problematic, if not potentially dangerous. The ability to have power supplied by a secondary power source (e.g., a generator) when a power outage is experienced is not only a convenience, but potentially money, or even life, saving.

Current secondary power systems have a set maximum power output. The decision of what size generator is needed is based on the amount of amp load that could possibly be drawn. Additionally, according to the 2011 National Electrical Code, Article 702.4(B) (2), an automatic transfer switch must be able to simultaneously operate all of the loads to which it is connected, unless it includes a load management system. Therefore, a system that cuts power to continuous loads for a limited time in order to allow critical intermittent loads to be activated without exceeding the amp load rating of the secondary power source allows for the use of the smallest and most efficient possible generator.

Further, there is a need for automatic transfer switches capable of handling larger disconnect/breaker sizes (e.g., 200 amps) for larger emergency backup systems.

SUMMARY OF THE INVENTION

The present invention comprises a load management module for disconnecting continuous loads for a predetermined amount of time when an excessive load is experienced to permit critical intermittent loads to remain energized. The load management module has a first group of relays and a second group of relays each connected to various intermittent loads (e.g., lighting branch circuits) and each controlled by a timer. The load management module activates the relays when a maximum power output of a secondary power source is exceeded.

The present invention also comprises an automatic transfer switch capable of operating with larger disconnect/breaker sizes (e.g., 200 amps) for larger emergency backup systems. The automatic transfer switch comprises a plate operably connected to a drive system and a pair of breakers.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined. by the claims.

Figure 1:
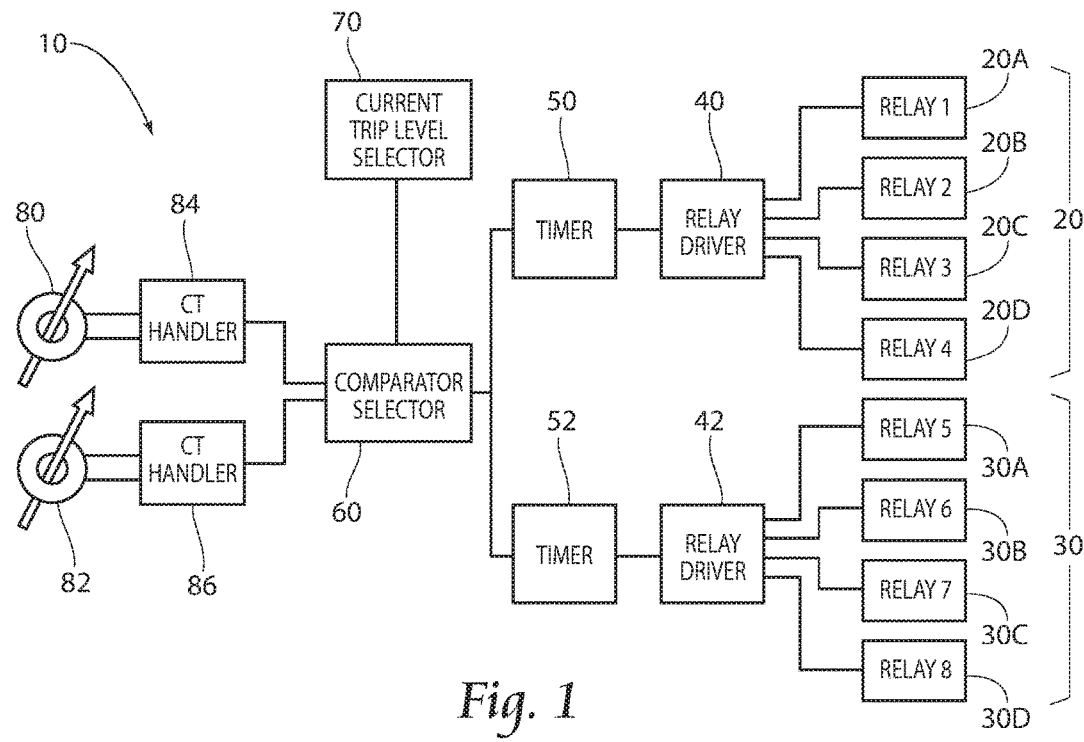
FIG. 1 is a schematic of the load management module according to the present invention.

FIG. 1 illustrates a schematic drawing of the preferred electronics of a load management module 10 according to the present invention. The load management module preferably has a first set of relays 20; a first relay driver 40; a first timer 50; a second set of relays 30, a second relay driver 42; a second timer 52; a comparator selector 60; a current trip level selector 70; a first current transformer 80; and a second. current transformer 82.

As shown here, the first relay driver 40 is preferably configured to drive the first set of relays 20, shown. here preferably comprising four individual normally closed relays (20A, 20B, 20C, 20D). Similarly, the second relay driver 42 is preferably configured to drive the second set of relays 30, shown here preferably comprising four individual normally closed relays (30A, 30B, 30C, 30D).

Each relay (20A, 20B, 20C, 20D, 30A, 30B, 30C, 30D) is preferably configured to control one electrical branch circuit (not shown), for example, in a residential or light commercial building. For instance, relay 20A may control power to a living room lights and receptacles branch circuit and relay 30B may control power to a kitchen receptacles branch circuit.

Preferably, the first set of relays 20 is controlled by the first relay timer 40 and the second set of relays 30 is controlled by the second relay timer 42.

The first and second current transformers (80,82) are configured to supply a calibrated current, proportional to the current draw on L1 and L2 of a secondary power source (e.g. a generator) (not shown), through respective first and second current transformer handlers 84,86. The voltage developed by each of the first and second current transformers 80,82 is passed to a comparator circuit in the comparator selector 60 and is compared against a known reference voltage, provided by the current trip level selector 70, which is calculated to represent a percentage of the maximum allowable current draw from a generator (not shown) of a particular size.

If the voltage from either of the first or second current transformers 80,82 ever exceeds the reference voltage (indicating that current is being drawn in excess of the maximum allowable current the generator can produce), the comparator is activated and sends a signal to the first and second timers 50,52. The first and second timers 50,52 output a signal that activates the respective relay driver 40,42 to energize each of the first and second sets of relays 20,30, respectively. This results in the opening the relays (20A, 20B, 20C, 20D, 30A, 30B, 30C, 30D), thus disabling the particular electrical circuits controlled by each of the respective relays (20A, 20B, 20C, 20D, 30A, 30B, 30C, 30D).

At the time of relay opening, the first and second timers 50,52 begin counting down from a predetermined time. As a non-limiting example, the first timer 50 may be set to count down from approximately 3.5 minutes and the second timer 52 may be set to count down from approximately 7 minutes.

If the disabling of the circuits, eight in this case, lowers the current draw down below the maximum allowable level, the load management module 10 will reconnect the four circuits connected to the first set of relays 20 in approximately 3.5 minutes. If the current draw remains below the maximum allowable level, the four circuits connected to the second set of relays 30 will reconnect in approximately 7 minutes. However, if at any time during the timed period, the current draw exceeds the maximum allowable level, all relays (20A, 20B, 20C, 20D, 30A, 30B, 30C, 30D) will remain energized (i.e., open) or, in the case of the first set of relays 20 being reenergized after the first timer 50 times out, the first set of relays 20 will be energized (i.e., opened) again to disable the attached circuits.

In the event that the disabling of the circuits does not bring the current draw down below the maximum allowable level, the relays will remain energized (i.e., open), and the circuits will remain disabled. As a non-liming example, a 50 amp generator is operating at 47 amps. A sump pump (not shown) is activated, requiring power, and the system load rises to 55 amps. The load management module 10 detects the overcurrent situation, activates and shuts off the eight continuous loads (e.g., outdoor lighting, living room lights, etc.) connected respectively to the eight relays (20A, 20B, 20C, 20D, 30A, 30B, 30C, 30D). In this example, the system load drops to 40 amps. The sump pump (not shown) is able to finish its job and shut off. After the first timer 50 times out, the circuits connected to the first set of relays 20 turn back on, and after the second timer 52 times out, the circuits connected to the second set of relays 30 turn back on.

Turning now to FIGS. 2-5, an automatic transfer switch 100 according to the present invention is shown. The automatic transfer switch 100 preferably comprises a plate 110, a pair of electrical breakers 160,170, and a drive system 150.

Each of the breakers 160,170 comprises a switch handle 162,172, respectively, which can be moved linearly to open or close a contact (not shown) within the breakers 160,170. The breakers 160,170 are preferably 2-pole, 200-amp rated circuit breakers, but other breakers are contemplated. The first breaker 160 may be fed by a primary power source, hereinafter referred to as utility power, and the second breaker 170 may be fed by a secondary power source, hereinafter referred to as a generator (not shown).

The drive system 150 preferably comprises a servomotor 152, or similar device as is known in the art, a cam member 154, and an arm 156. The cam member 154 is attached to and driven by the servomotor 152 and the arm 156 is attached to cam member 154, extending out of the cam member 154 in the same direction as the axis of rotation of the servomotor 152, but located distally from the axis of rotation.

The plate 110 preferably comprise a first elongate aperture 112, a second elongate aperture 118, a third elongate aperture 124, and a plurality of slots 130. The first elongate aperture 112 preferably has a first side 114, a second side 116, and a length 132 and is configured to receive the switch handle 162 of the first breaker 160. The second elongate aperture 118 preferably has a first side 120, a second side 122, and a length 134 and is configured to receive the switch handle 172 of the second breaker 170. The third elongate aperture 124 preferably has a first side 126 and a second side 128 and is configured to receive the arm 156 of the drive system 150. The plurality of slots 130 are configured to receive a plurality of pins 180, respectively.

The third elongate aperture 124 is preferably substantially perpendicular to the first and second elongate apertures 112,118 and therefore perpendicular to the movement of the plate 110 as discussed further below.

The automatic transfer switch 100 has the first and second breakers 160,170 installed in opposition to one another, with their outputs tied to one another. In this configuration, when the first breaker 160 is on and the second breaker 170 is off (see FIGS. 4 and 5), the first breaker 160 outputs utility power. When the second breaker 170 is on and the first breaker 160 is off (see FIGS. 2 and 3), the second breaker 170 outputs power from the generator (not shown).

Figure 2:
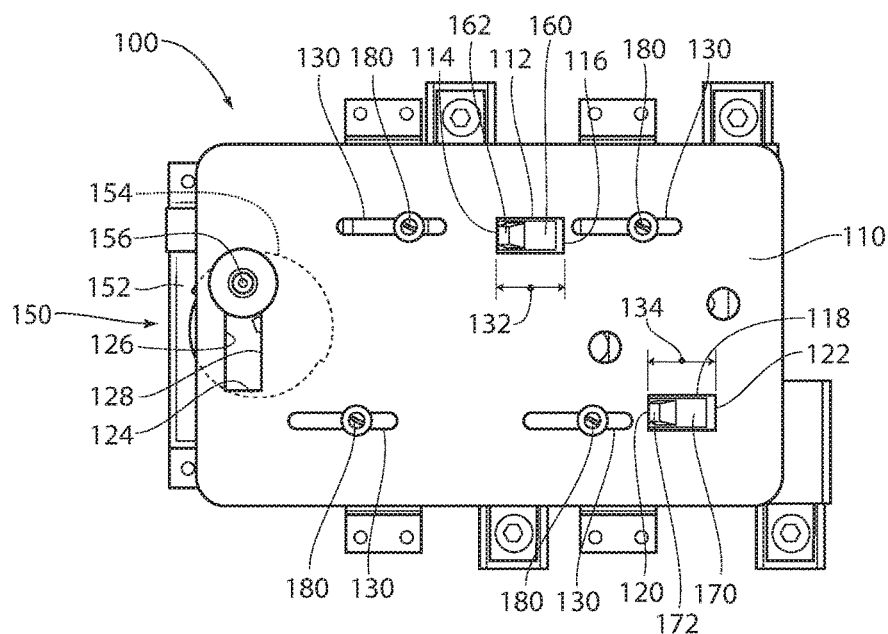
FIG. 2 is a side elevation view of an automatic transfer switch according to the present invention.
Figure 3:
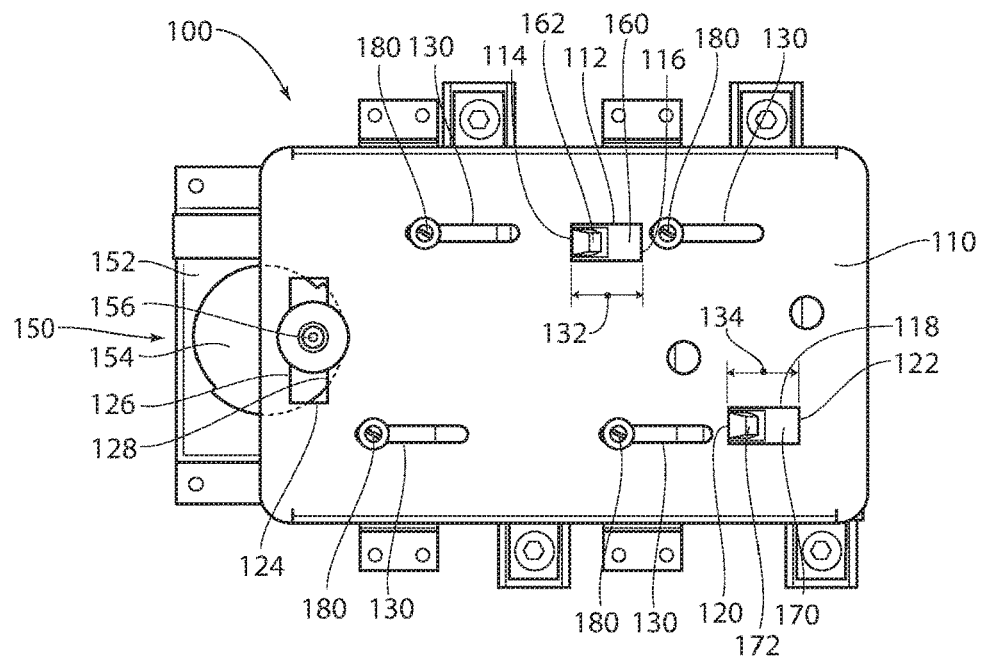
FIG. 3 is a side elevation view of the automatic transfer switch of FIG. 2.

In operation, starting with the plate 110 in plate position one shown in FIG. 2, the arm 156 of the drive system 150 is positioned near the top of the third elongate aperture 124 between the first and second sides 126,128. The switch handle 162 of the first breaker 160 is adjacent to the first side 114 of the first elongate aperture 112 in an "off," or "open," position. The switch handle 172 of the second breaker 170 is adjacent to the first side 120 of the second breaker 118 in an "on," or "closed," position. Thus power is being supplied by a generator (not shown) to the output.

It should be noted that assignment of plate position numbers and reference to orientation is merely for discussion purposes and should not be construed as limiting.

If the automatic transfer switch 100 receives a signal to switch to utility power from the generator, the servomotor 152 rotates the cam member 154 clockwise and places the arm 156 of the drive system 150 in contact with the second side 128 of the third elongate aperture 124. As the servomotor 152 continues to turn and places the plate 110 in plate position two (shown in FIG. 3), the first side 114 of the first elongate aperture 112 moves the switch handle 162 of the first breaker 160 into the closed position, but not before the first side 120 of the second elongate aperture 118 moves the switch handle 172 of the second breaker 170 to the open position.

Figure 4:
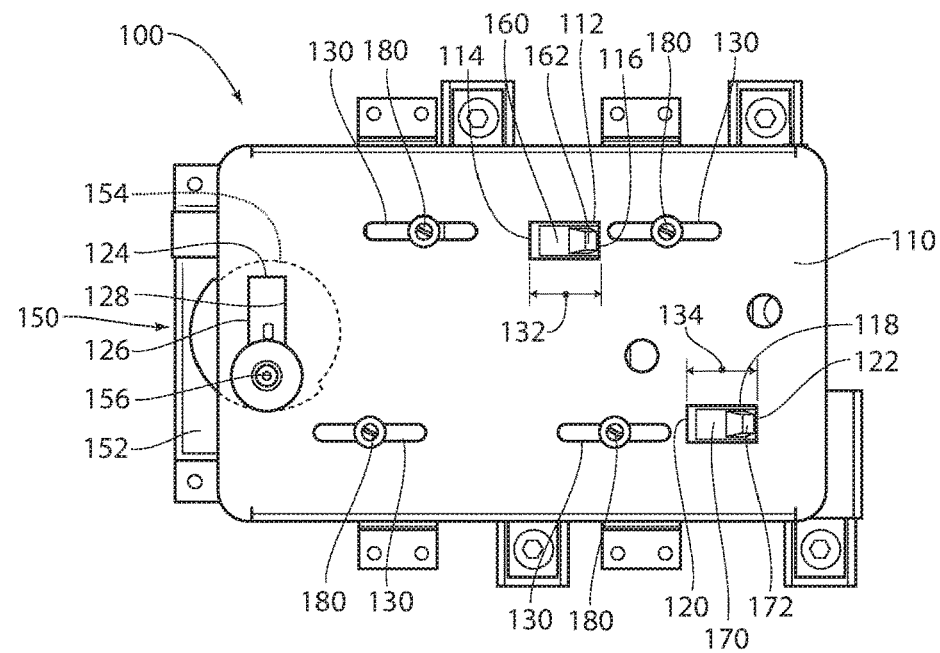
FIG. 4 is a side elevation view of the automatic transfer switch of FIG. 2.
Figure 5:
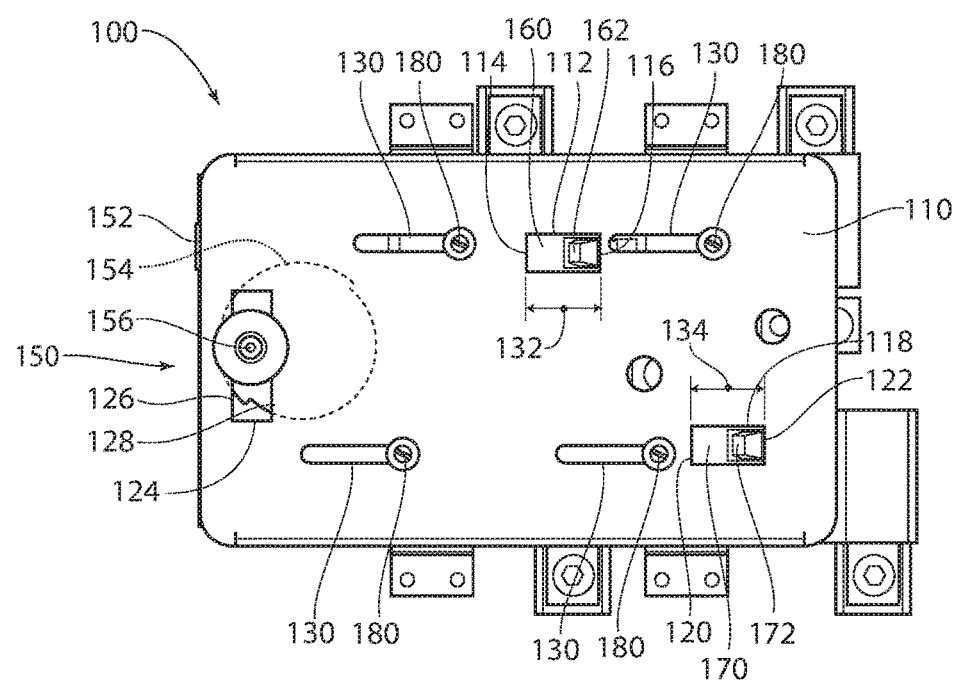
FIG. 5 is a side elevation view of the automatic transfer switch of FIG. 2.

The servomotor 152 continues to rotate until the plate 110 reaches plate position three (shown in FIG. 4). Here, the arm 156 of the drive system 150 is positioned near the bottom of the third elongate aperture 124 between the first and second sides 126,128. The switch handle 162 of the first breaker 160 is adjacent to the second side 116 of the first elongate aperture 112 and the switch handle 172 of the second breaker 170 is adjacent to the second side 122 of the second elongate aperture 118.

When the automatic transfer switch 100 receives a signal to switch to the generator (not shown) from utility power, the servomotor 152 rotates the cam member 154 clockwise and places the arm 156 of the drive system 150 in contact with the first side 126 of the third elongate aperture 124. As the servomotor 152 continues to turn and ultimately places the plate 110 in plate position four (shown in FIG. 5), the second side 116 of the first elongate aperture 112 moves the switch handle 162 of the first breaker 160 into the open position before the second side 122 of the second elongate aperture 118 moves the switch handle 172 of the second breaker 170 to the closed position. The servomotor 152 then continues to rotate to place the plate 110 in position one. (see FIG. 2).

The lengths 130,132 of the first and second elongate apertures 112,118 is preferably approximately the same or slightly longer than the distance of the throw needed to reset the first and second breakers 160,170. As shown in FIG. 2, when the plate 110 is in plate position one, the second breaker 170 is capable of being reset within the second elongate aperture 118 if a current greater than the amp rating of the second breaker 170 is experienced. Similarly, as shown in FIG. 4, when the plate 110 is in plate position three, the first breaker 160 is capable of being reset within the first elongate aperture 112 if a current greater than the amp rating of the first breaker 160 is experienced. The lengths 130,132 are also preferably sized to sequence the breakers 160,170 between open and closed states with minimal travel of the plate 110.

The plate 110 prevents both breakers 160,170 from both being in the closed position when switching from utility power to generator power and vice versa.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

I claim:

1. A method for managing loads supplied by a secondary power source, the method comprising the steps of:
   providing a first set of normally closed relays electrically connected to a first plurality of loads;
   providing a second set of normally closed relays electrically connected to a second plurality of loads;
   providing a first timer electrically connected to the first set of relays and set to a predetermined amount of time;
   providing a second timer electrically connected to the second set of relays and set to a predetermined amount of time, wherein the set time of the second timer is greater than the set time of the first timer;
   providing a first current transformer;
   providing a second current transformer;
   wherein the first and second current transformers receive a current draw from the secondary power source and produce an actual voltage proportional to the current passed through each of the first and second current transformers;
   providing a reference voltage, wherein the reference voltage is a voltage equal to a predetermined percentage of a maximum allowable current draw from the secondary power source;
   monitoring the actual voltage;
   comparing the reference voltage with the actual voltage; and
   when the actual voltage exceeds the reference voltage:
      opening both the first and second set of relays;
      starting both the first and second timers;
      when the set time of the first timer elapses, close the first set of relays; and
      when the set time of the second timer elapses, close the second set of relays.

2. The method of claim 1, wherein the set time of the first timer is 3.5 minutes.

3. The method of claim 1, wherein the set time of the second timer is 7 minutes.

4. The method of claim 1, wherein the first set of relays comprises four relays.

5. The method of claim 1, further comprising the steps of providing a first, relay driver configured to control the first set of relays, and when the actual voltage exceeds the reference voltage, sending a signal to open the first set of relays.

6. The method of claim 1, wherein the second set of relays comprises four relays.

7. The method of claim 1, further comprising the steps of providing a first relay driver configured to control the second set of relays, and when the actual voltage exceeds the reference voltage, sending a signal to open the second set of relays.

8. An automatic transfer switch comprising:
   a first breaker with a switch handle;
   a second breaker with a switch handle and mechanically oriented to be in opposition to the first breaker;
   a drive system comprising a servomotor with an axis of rotation, a cam member, and an arm, wherein the cam member is operatively connected to the servomotor and the arm extends from the cam member in the same direction as the axis of rotation, but positioned distally from the axis of rotation;
   a plate comprising a first elongate aperture, a second elongate aperture, and a third elongate aperture, wherein the major axis of the first and second elongate apertures are perpendicular to the major axis of the third elongate aperture;
   wherein the first elongate aperture is configured to receive the switch handle of the first breaker;
   wherein the second elongate aperture is configured to receive the switch handle of the second breaker;
   wherein the third elongate aperture is configured to receive and be in operative contact with the arm of the drive system; and
   wherein rotation of the servomotor translates into linear motion of the plate relative to the first and second breakers.

9. The automatic transfer switch of claim 8,
   wherein the first breaker has a closed state and an open state,
   wherein the second breaker has a closed state and an open state; and
   whereby, when the first breaker is in its closed state, the second breaker is in its open state, and when the second breaker is in its closed state, the first breaker is in its open state.

10. The automatic transfer switch of claim 8,
    wherein the switch handle for the first breaker has a switch handle throw distance and the first elongate aperture has a length; and
    whereby the length of the first elongate aperture is equal to or greater than the throw distance of the switch handle for the first breaker.

11. The automatic transfer switch of claim 8, further comprising a plurality of slots configured to receive a plurality of pins, wherein the relationship between the plurality of pins and the plurality of slots promotes linear plate movement.

* * * * *